US005170054A

United States Patent [19]

Franzen

[11] Patent Number: 5,170,054

[45] Date of Patent: Dec. 8, 1992

[54] MASS SPECTROMETRIC HIGH-FREQUENCY QUADRUPOLE CAGE WITH OVERLAID MULTIPOLE FIELDS

[75] Inventor: Jochen Franzen, Bremen, Fed. Rep. of Germany

[73] Assignee: Bruker-Franzen Analytik GmbH, Fed. Rep. of Germany

[21] Appl. No.: 703,892

[22] Filed: May 22, 1991

[30] Foreign Application Priority Data

May 29, 1990 [DE] Fed. Rep. of Germany ....... 4017264

[51] Int. Cl.[5] ........................ B01D 59/44; H01J 49/40

[52] U.S. Cl. .................................... 250/292; 250/281

[58] Field of Search ........................ 250/281, 292, 290

[56] References Cited

U.S. PATENT DOCUMENTS 4,882,484 11/1989 Franzen et al. .................... 250/290

4,975,577 12/1990 Franzen et al. .................... 250/290

*Primary Examiner*—Bruce C. Anderson

[57] ABSTRACT

Ion cage mass spectrometer, also referred to as quistor or ion trap, comprising a ring electrode and two end cap electrodes, voltage supplies for generating an ion-storing HF-quadrupole field, means for generating ions of the substances to be mass-spectrometrically investigated inside or outside the ion cage, potentially means for introducing the ions into the ion cage, means for the documentation of such ions that emerge from the ion cage, characterized in that a hexapole potential $$P_q=(A_2/4z_0^2)*(r^2-2z^2)[U-V\cos(\omega t)]$$

or an octopole potential $$P_s=(A_3/4z_0^3)*(3r^2z-2z^3)*[U-V\cos(\omega t)],$$

or a linear combination of both is exactly or approximately superimposed on the exact quadrupole potential $$P_0=(A_4/4z_0^4)*(r^4+8z^4/3-8r^2z^2)*[U-V\cos(\omega t)],$$

by special shaping of the electrodes, wherein
r=distance from the z-axis,
z=distance from the plane z=0,
$Z_0$=distance of the end cap from the center z=0,
$A_2$=strength of the quadrupole field,
$A_3$=strength of the hexapole field,
$A_4$=strength of the octopole field,
U=value of the DC voltage,
V=peak value of the AC voltage,
ω=radian frequency of the AC voltage, and
t=time.

6 Claims, 3 Drawing Sheets

MASS SPECTROMETRIC HIGH-FREQUENCY QUADRUPOLE CAGE WITH OVERLAID MULTIPOLE FIELDS

FIELD OF THE INVENTION

The invention relates to an ion cage mass spectrometer, a quistor, an ion trap or the like and especially to such a device having multiple fields of special characteristics generated by the surface shapes of their electrodes.

BACKGROUND OF THE INVENTION

German Patent 944 900 discloses a mass spectrometer wherein the electrodes are arranged such that the surfaces of the ring electrode and of the end cap electrodes form a one-part hyperboloid of revolution or, respectively, a two-part hyperboloid of revolution, whereby the end cap electrodes are conductively connected to one another and a chronologically variable voltage is applied between the ring electrode and the end cap electrodes. When a potential $U+V\cdot\sin(\omega t)$ is generated between the ring electrode and the end cap electrodes, ions whose specific charge e/m lies in a defined range remain between the electrodes, whereas the others impinge onto the electrodes. The overlaying of constant field and high-frequency field in such mass spectrometers is referred to as quadrupole storage field. To a good approximation, the ion motion forms a spatial overlaying of two independent harmonic oscillators. The forces of the storage field that act on the ions oscillate in the ion cage formed as a result thereof. The force integrated over half of what is referred to as the secular period approximately satisfies the condition of a harmonic oscillator, so that such a system is also referred to as pseudo-harmonic oscillator. Two such pseudo-harmonic oscillator systems form the aforementioned ion cage that is also referred to as quistor or as ion trap (regarding the terminology: Dawson, "Quadrupole Mass Spectrometry", Elsevier, Amsterdam, 1976; Mahrs/Hughes, "Quadrupole Storage Mass Spectrometry", John Wiley & Sons, New York 1989). The two pseudo-harmonic oscillator systems of the quistor are thereby composed of a cylindrically symmetrical system that exhibits the same behavior independently of the coordinate in the direction of the cylinder axis (z-axis) and of a plane system whose behavior is independent of the distance r from the cylinder axis.

The ions oscillate with what are referred to as "secular frequencies" in both pseudo-harmonic oscillator systems, i.e. in the r-direction and in the z-direction, these "secular frequencies" are completely independent of one another. The secular frequencies can be calculated according to known equations. Since the secular frequencies in the r-direction and in the z-direction and the storage frequency have a common divisor only in rare situations, the motional images of the ions are usually extremely complicated.

An ion cage can be used as a mass spectrometer. The known, fundamental principle of mass spectrometry is comprised in identifying the proportions of the ions having different masses relative to one another. What is referred to as a scan method is employed, which implements the measurement of the various ion types in chronological succession by variation of measuring or filtering conditions. A variety of scan methods are known for the ion cage.

Here, however, only the method of mass-selective ejection of ions from the cage is of interest. To that end, the ions of successive masses are ejected from the cage in chronological succession and are supplied to a documentation system, so that the measured signals of the ions can be processed in a known way to form a mass spectrum.

As already known, the mass-selective ejection can ensue in three different ways. First, the ions can be ejected because the storage conditions in the ion cage are modified such that the ions proceed beyond the edge of the stability range mass-by-mass, become instable and leave the ion cage (mass-selective instability scan, U.S. Pat. No. 4,540,884). Second, the secular frequency of successive ion masses can be excited and externally applied by high-frequency voltage, so that they absorb motion energy in resonance and thus depart the cage ("mass-selective resonance scan by excitation frequency", U.S. Pat. No. 4,736,101). And, third, the ions can be introduced into an apparatus-specific, non-linear resonance condition in which they absorb motion energy and depart the cage ("mass-selective scan by non-linear apparatus resonance", U.S. Pat. No. 4,882,484).

It is desirable in all applications of the ion cage as a mass spectrometer that the ejection process of non-specific ions takes place as fast as possible.

U.S. Pat. No. 4,882,484 already discloses a mass spectrometer of the species wherein the non-linear resonances of an octopole field overlaid on the quadrupole field are employed for accelerating the production of the mass spectrum. A universally valid teaching of the structure and form of the multipole field overlaying of the quadrupole field cannot be derived from this patent.

The known quadrupole cage can be employed not only for identifying individually supplied substances on the basis of their primary spectra but can also be utilized for the identification of mixed constituents on the basis of tandem mass spectrometry, whereby daughter ion spectra are produced. One ion type, the parent ions, is thereby selected first; all other ion types are removed from the cage. The parent ion is then fragmented by collision with a gas introduced into the cage for this purpose. To that end, the parent ion must be accelerated in order to elevate the collision energy above the threshold for the fragmentation. It is simplest to excite ion oscillation in the z-direction using an AC voltage between the end cap electrodes that is in resonance with the corresponding secular frequency.

The excitation in the known quadrupole cages, however, is critical. The amplitude of the secular motion increases linearly with the time in the quadrupole field and the ions will ultimately collide with the end cap electrodes. A fine tuning between a low excitation voltage and a high collision gas density is required, whereby a yield of approximately 30 through 50% of daughter ions can be achieved; the rest of the parent ions are lost.

It is therefore the object of the invention to improve the mass spectrometer by establishing a general rule for the multifield overlaying, for enhancing the capability and the detection power given further resolution of the measurement of the mass spectrum. In this way, for tandem mass spectrometry, the ion losses from the spectrometer due to undesired resonances should be reduced and the yield in impact-induced fragmentation should be increased.

In a mass spectrometer, this object is achieved by shaping the electrodes to yield a special field characteristic. Especially advantageous embodiments of the invention are described hereinafter.

The invention is based on the surprising perception that, given a multipole overlaying of the invention—whether in a mathematically exact description or based on an approximation equation, one succeeds in reducing the chronological smearing of the ejection process, as a result whereof the production of the mass spectrum is facilitated. Further, ion losses are reduced and the yield of daughter ions is improved. The overlaying of z-asymmetrical multipole fields improves the ejection due to the non-linear resonance effects that then arise.

It has been shown that it is generally not necessary to overlay multipole fields of a higher order than octopole fields on the basic quadrupole field, even though this is fundamentally possible and lies within the scope of the invention. Let it be pointed out that the appearance of non-linear resonances and their sequels are described by F. v. Busch and W. Paul in the "Zeitschrift fuer Physik" 164, pages 588-594 (1961). It is found therein that the non-linear resonances produced by field errors in the mass spectrometer are so weakly pronounced that they do not have a negative influence on the functionability thereof but can merely lead to a splitting of mass lines in the spectrum. Advantageous effects of the non-linear resonances are not recognized, so how these non-linear resonances could lead to an improvement of the properties of the mass spectrometer cannot be derived from this publication.

The surface shape of the electrodes in the invention is selected such that the effect of the desired multipole field overlaying derives. Given the mathematically exact embodiments of the invention, the precise dimensions of the electrodes are defined by the relative strength $A_3$ of the hexapole field or, respectively, by the relative strength $A_4$ of the octopole field with reference to the strength $A_2$ of the quadrupole field. The strengths of the hexapole field or, respectively, of the octopole field with reference to the quadrupole field can lie between approximately 0% and 20%, whereby it is especially advantageous when the amount of the overlaid fields amounts to between 0.5% and 4.5%. In an especially preferred embodiment, the proportion lies between 1% and 3%.

In accord with the inventively recited equations, the electrodes can be easily shaped such that mathematically exact overlayings of the quadrupole field with prescribed amounts of the octopole field or, respectively, of the hexapole field are obtained. The deviations due to the overlaid fields are thereby felt mainly in the outside regions of the spectrometer space, whereas a nearly exact quadrupole field is present in the region of the center.

Let it be noted that the fabrication of electrodes according to the rule of the invention in an embodiment conforming to one embodiment is implemented by successive attachment of terms of a higher order in w, once the dimension $p_1$ for the part of the octopole field, the dimension $p_2$ for the part of the hexapole field or, respectively, the correction part $p_3$ of the octopole field have been prescribed. It is in turn advantageous when $p_1$, $p_2$ and $p_3$ lie between 0% and 20% inclusive, whereby these values should not simultaneously assume the value zero so that an overlaying term is sure to contribute in any case.

DESCRIPTION OF THE DRAWINGS

The invention shall be set forth in detail below on the basis of exemplary embodiments with reference to the schematic drawing. Thereby shown are.

DESCRIPTION OF THE PREFERRED EMBODIMENT

Figure 1:
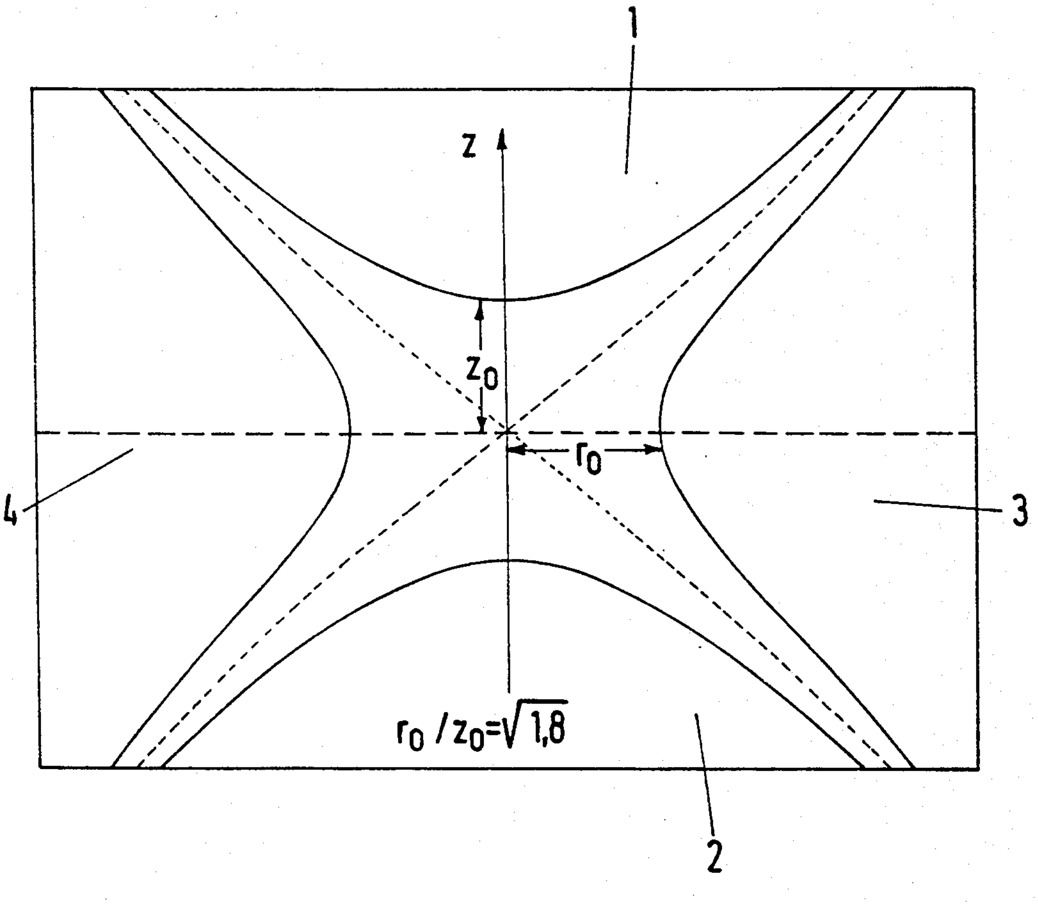
FIG. 1 is a longitudinal section through an electrode arrangement of a mass spectrometer of the present invention, whereby an octopole field as multipole field of a higher order is overlaid on a basic quadrupole field.

FIG. 1 shows the arrangement of two end cap electrodes 1 and 2, each of which is respectively arranged at a distance $z_0$ from the equator plane 4. The descriptive coordinate system is selected such that the equator plane 4 coincides with the coordinate plane $z=0$. A ring electrode 3 is situated such between the end cap electrodes 1, 2 that the overall arrangement of the electrodes 1, 2, 3 is axially symmetrical, whereby the axis of symmetry coincides with the z-axis of the coordinate system. The distance of the ring electrode 3 from the center point $z=0$ in the equator plane 4 is referenced $r_0$. The electrode arrangement is selected such that $r_0/z_0=\sqrt{1.8}$. The octopole field generated by the electrode shape has a strength $A_4/A_2$ of 2% measured in the equator plane 4 at the ring electrode 3. Due to the overlaid field, non-linear forces are generated both in z-direction as well as being dependent or r, the distance from the z-axis. As a result thereof, the secular frequencies become dependent on the secular amplitudes and either increase or decrease. A resonance catastrophe of the secular amplitude, however, is prevented in both instances. Due to the octopole field, the increasing secular oscillation shifts in frequency and in phase and reaches a maximum amplitude when the phase shift amounts to 90%; thereafter, the amplitude again decreases. The octopole field as well as all other "even-numbered" multipole fields therefore have a surprisingly positive influence. Nearly all ion losses due to resonance effects are prevented no matter what might have caused the resonance.

Normally disturbing resonances can be (1) resonances between the end cap electrodes 1, 2 that are produced by an excitation frequency;

(2) non-linear resonances from overlayings of frequencies shifted in comparison to the storage frequency or produced by multipole fields that are generated by imprecise arrangement of the electrodes or as a result of surface charges on the electrodes as well.

An exception is formed only by what is referred to as the octopole sum resonance, in which the ion absorbs energy both in the r-direction as well as in the z-direction.

The electrode arrangement of FIG. 1 also makes it possible to avoid the disadvantages of the prior art with respect to the generation of daughter ions. When an octopole field is overlaid on the basic quadrupole field, the excitation voltage can be selected such that the parent ions never reach the end cap electrodes 1, 2. Yields of daughter ions on the order of magnitude of 80 through 100% of the parent ions are thus possible.

An octopole field that normally blocks the resonance reactions of ions can nonetheless have positive influences on the resonance reaction during a scan procedure. When the secular frequency reaches the outer excitation frequency, the effects from the increase of the scan frequency and the decrease of the amplitude are compensated because of the coupling of secular frequency and secular amplitude, as a result whereof the ion is ejected from the mass spectrometer.

Figure 2:
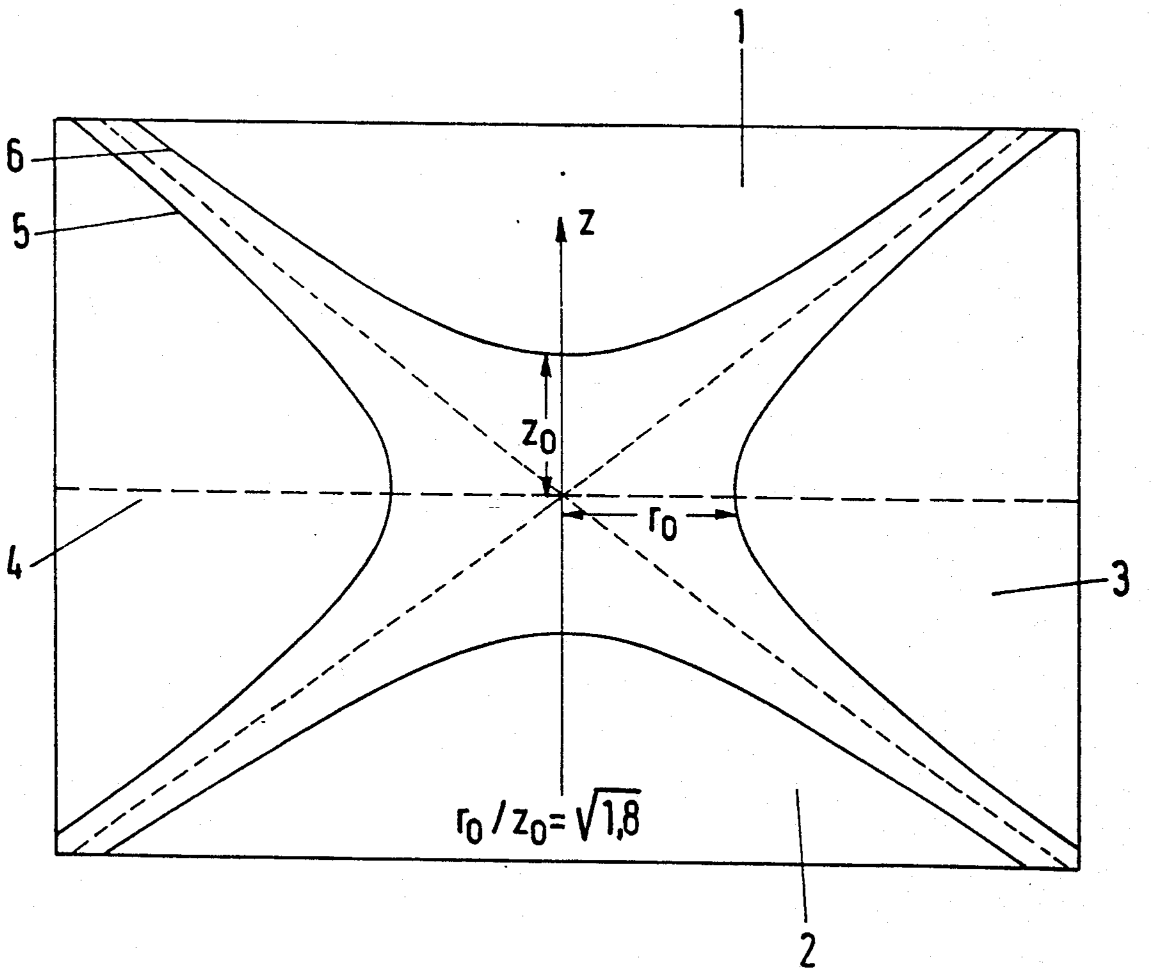
FIG. 2 is a longitudinal section through the electrode arrangement, whereby a hexapole field is overlaid.

FIG. 2 shows an electrode arrangement composed of end cap electrodes 1, 2 and ring electrode 3, whereby the electrodes are shaped such that a hexapole field is overlaid on the basic quadrupole field. The dimensioning of the electrodes otherwise coincides with that of FIG. 1; in particular, $r_0/z_0=\sqrt{1.8}$ again is true. The dotted line 5, 6, indicate the corresponding electrode structure with which a pure quadrupole field would be present. It may be seen that deviations arise only in the outside regions of the electrode arrangement, whereas a nearly exact quadrupole field is produced in the inside region. The secular frequency in the z-direction remains essentially unaltered due to the overlaying of the hexapole field, whereas a frequency splitting occurs in the r-direction. The hexapole field generates a highly non-linear resonance at a frequency that lies at exactly one-third of the storage frequency. When an excitation voltage is then applied in-phase and with this frequency, the ion oscillation is initially increased by this excitation voltage, leading to a linear rise in the secular amplitude; the oscillation will then rise exponentially due to the hexapole resonance. The hexapole resonance can therefore be used for a mass-selective ejection of the ion. The ejection process is therefore tightened due to the overlaying of the hexapole field. Good results are thereby achieved when the part $A_3$ of the overlaying hexapole field amounts to 2% of the quadrupole field.

Figure 3:
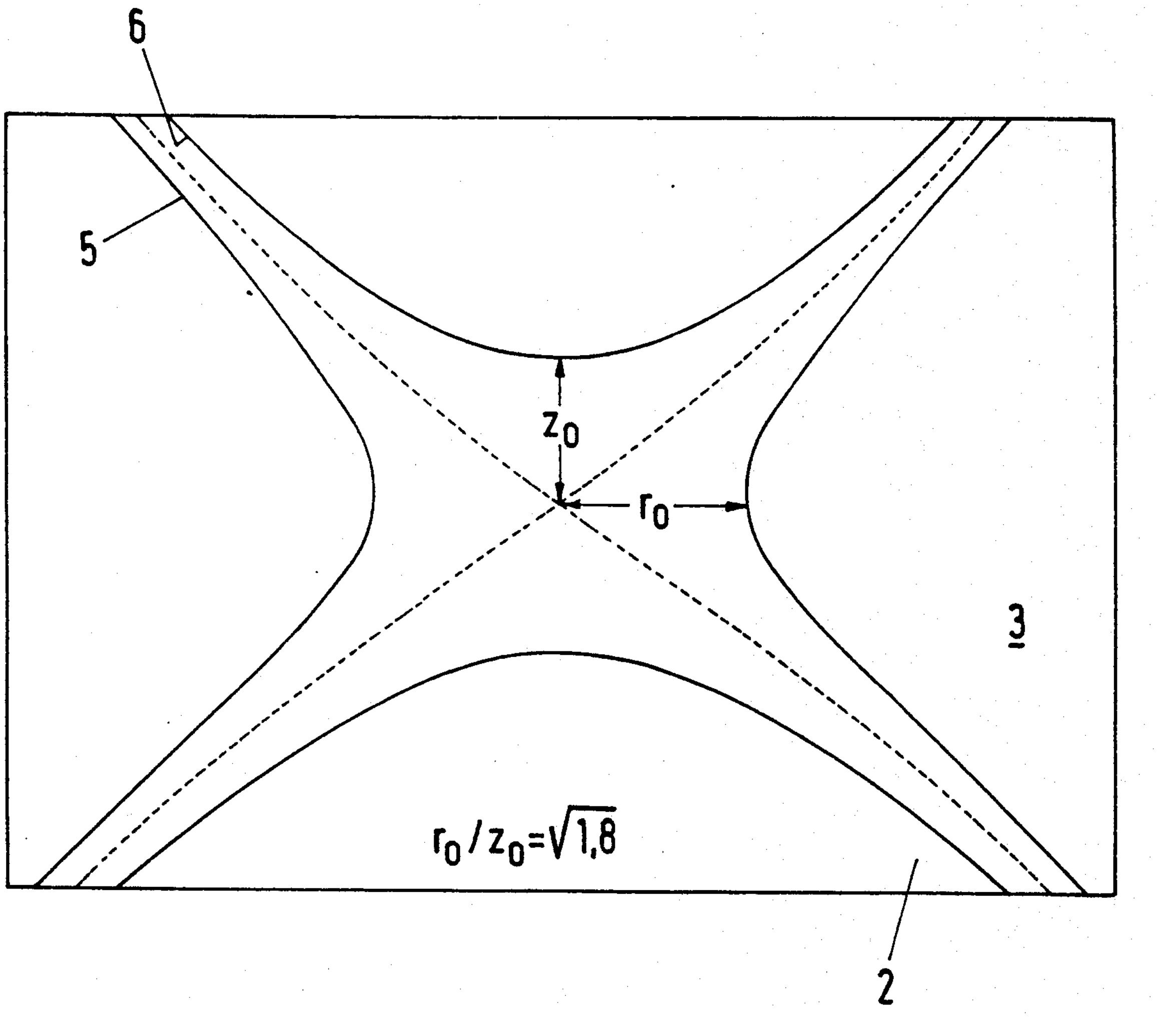
FIG. 3 is a longitudinal section through the electrode arrangement, whereby both an octopole as well as a hexapole field are overlaid.

FIG. 3 shows an electrode arrangement wherein both an overlaid octopole field as well as an overlaid hexapole field have been produced, whereby the octopole part amounts to 2% and the hexapole part amounts to 6%. The combination of the two overlaid fields results therein that the advantages of both systems are realized in the arrangement. The ion losses are reduced due to the octopole affect; the non-linear resonance of the hexapole field promotes the ejection of the ions and intensifies the ejection process. It has been found that the best results are achieved when the part $A_3$ of the overlaid hexapole field is twice as great as the part $A_4$ of the overlaid octopole field.

By means of the present invention, the electrodes are shaped to yield a field having a hexapole potential $$P_q=(A_2/4z_0^2)*(r^2-4z^2)\,[U-V\cos(\omega t)]$$

or an octopole potential $$P_s=(A_3/4z_0^3)*(3r^2z-z^3)*[U-V\cos(\omega t)],$$

or a combination of both superimposed on a quadrupole potential $$P_0=(A_4/4z_0^4)*(r^4+8z^4/3-8r^2z^2)*[U-V\cos(\omega t)],$$

in which $r$ = distance from the z-axis,
$z$ = distance from the plane $z=0$,
$z_0$ = distance of the end cap from the center $z=0$,
$Z_2$ = strength of the quadrupole field, $A_3$ = strength of the hexapole field,
$A_4$ = strength of the octopole field,
$U$ = value of the DC voltage,
$V$ = peak value of the AC voltage,
$\omega$ = radian frequency of the AC voltage, and
$t$ = time.

In a more specific embodiment, there is an overlaying of exact hexapole and octopole fields which are established according to the equations $$r_k(z)=\sqrt{(d-\sqrt{(d^2+e_k)}\,)}$$

and $$r_r(z)=\sqrt{(d-\sqrt{(d^2+e_r)}\,)}$$

on the basis of a surface shape of the end cap electrodes (1, 2) $r_k(z)$ and of the ring electrode (3) $r_r(z)$, wherein $$d=4*z^2-(3A_3/2A_4)*z*z_0-(A_2/2A_4)*z_0^2,$$

$$e_k=(2A_2/A_4)*z_0^2*z_2+(2A_3/A_4)*z_0*z^3-(8/3)*z^4+P_k,$$

$$e_r=(2A_2/A_4)*z_0^2*z^2+(2A_3/A_4)*z_0*z^3-(8/3)*z^4+P_r$$

whereby $P_k$ and $P_r$ are proportional to the desired peak AC potentials at the electrodes (1, 2 and 3). The surface shapes of the end cap electrodes (1, 2) $r_k(z)$ and of the ring electrode (3) $r_r(z)$ may be established according to the $$r_k(z)=\sqrt{(d-\sqrt{(d^2+f_k)}\,)}$$

and $$r_r(z)=\sqrt{(d-\sqrt{(d^2+f_r)}\,)}$$

in which:

$$d=4*z^2-(3A_3/2A_4)*z*z_0-(A_2/2A_4)8z_0^2,$$

$$f_k=(2A_2/A_4)*z_0^2*(z^2-z_0^2)+(2A_3/A_4)*z_0*(z^3-z_0^3)-(8/3)*(z^4-z_0^4),\text{ and}$$

$$\text{i } f_r=(2A_2/A_4)*z_0^2*(z^2-z_0^2)+(2A_3/A_4)*z_0*(z^3-z_0^3)-(8/3)*(z^4-z_0^4).$$

A mass spectrometer according to the foregoing preferably has $A_4/A_2$ and $A_3/A_4$ between the following limits:

$$0.002>=A_4/A_2>=0.08,\text{ and}$$

$$0>=A_3/A_4>=0.169.$$

Another embodiment of mass spectrometer with the specified relation of hexapole potential superimposed on the quadrupole potential, has an overlaid, exact hexapole field, and the surface shapes of the end cap electrodes (1, 2) $r_k(z)$ and of the ring electrode (3) $r_r(z)$ are established according to the equations $$r_k = \sqrt{(2z^2 - 2z_0 2 * g(z))}$$

and $$r_r = \sqrt{(2z^2 + 2z_0 2 * g(z))}$$

with $$g(z)=(A_2/A_3)/(A_2+3*A_3*z/z_0), \text{ and}$$

$$0.001>=A_3/A_2>=0.2.$$

In an embodiment of mass spectrometer with approximated hexapole and octopole fields, characterized the multipole fields are preferably generated by surface shapes of the electrodes (1, 2, 3) according to the equations $$z_r(r)=(w_r+(p_1*w_r)+(p_2*w_{r2})+(p_3*w_r^3)),$$

$$z_k(r)=(w_k+(p_1*w_k)+(p_2*w_k^2)+(p_3*w_k^3)),$$

with $$w_r=w_r(r)=((r_2-r_0^2)/2),$$

$$w_k=w_k(r)=((r^2+r_0^2)/2),$$

and $0 \leqq p_1 \leqq 0.2$ (approximated octopole part) or $0 \leqq p_2 \leqq 0.2$ (approximated hexapole part), and/or $0 \leqq p_3 \leqq 0.2$ (for a more closely-approximated octopole part), however not with $p_1$, $p_2$, $p_3$ disappearing simultaneously.

Both individually as well as in the arbitrary combinations, the features of the invention disclosed in the above specification, in the drawing and in the claims can be critical to the realization of the various embodiments of the invention.

It will be apparent that various modifications and/or additions may be made in the apparatus of the invention without departing from the essential feature of novelty involved, which are intended to be defined and secured by the appended claims.

What is claimed is:

1. Ion cage mass spectrometer, also referred to as quistor or ion trap, comprising a ring electrode and two end cap electrodes, voltage supplies for generating an ion-storing HF-quadrupole field, means for generating ions of the substances to be mass-spectrometrically investigated inside or outside the ion cage, potentially means for introducing the ions into the ion cage, means for the detection of such ions that emerge from the ion cage, characterized in that a hexapole potential $$P_q=(A_2/4z_0^2)*(r^2-2z^2)\,[U-V\cos(\omega t)]$$

or an octopole potential $$P_s=(A_3/4z_0^3)*(3r^2z-2z^3)*[U-V\cos(\omega t)],$$

or a linear combination of both is exactly or approximately superimposed on the exact quadrupole potential $$P_0=(A_4/4z_0^4)*(r^4+8z^4/3-8r^2z^2)*[U-V\cos(\omega t)],$$

by special shaping of the electrodes, wherein $r$=distance from the z-axis, $z$=distance from the plane $z=0$, $z_0$=distance of the end cap from the center $z=0$, $A_2$=strength of the quadrupole field, $A_3$=strength of the hexapole field, $A_4$=strength of the octopole field, $U$=value of the DC voltage, $V$=peak value of the AC voltage, $\omega$=radian frequency of the AC voltage, and $t$=time.

2. Mass spectrometer according to claim 1, characterized in that an overlaying of exact hexapole and octopole fields is established according to the equations $$r_k(z) = \sqrt{(d - \sqrt{(d^2 + e_k)})}$$

and $$r_r(z) = \sqrt{(d - \sqrt{(d^2 + e_r)})}$$

on the basis of a surface shape of the end cap electrodes (1, 2) $r_k(z)$ and of the ring electrode (3) $r_r(z)$, wherein $$d=4*z^2-(3A_3/2A_4)*z*z_0-(A_2/2A_4)*z_0^2,$$

$$e_k=(2A_2/A_4)*z_0^2*z_2+(2A_3/A_4)*z_0*z^3-(8/3)*z^4+P_k,$$

$$e_r=(2A_2/A_4)*z_0^2*z^2+(2A_3/A_4)*z_0*z^3-(8/3)*z^4+P_r$$

whereby $P_k$ and $P_r$ are proportional to the desired peak AC potentials at the electrodes (1, 2 and 3).

3. Mass spectrometer according to claim 2, characterized in that the surface shapes of the end cap electrodes (1, 2) $r_k(z)$ and of the ring electrode (3) $r_r(z)$ are established according to the equations $$r_k(z) = \sqrt{(d - \sqrt{(d^2 + f_k)})}$$

$$r_r(z) = \sqrt{(d - \sqrt{(d^2 + f_r)})}$$

in which:

$$d=4*z^2-(3A_3/2A_4)*z*z_0-(A_2/2A_4)8z_0^2,$$

$$f_k=(2A_2/A_4)*z_0^2*(z^2-z_0^2)+(2A_3/A_4)*z_0*(z^3-z_0^3)-(8/3)*(z^4-z_0^4), \text{ and}$$

$$\text{i } f_r=(2A_2/A_4)*z_0^2*(z^2-z_0^2)+(2A_3/A_4)*z_0*(z^3-z_0^3)-(8/3)*(z^4-z_0^4).$$

4. Mass spectrometer according to claim 2 or 3, characterized in that $$0.002 \leqq = A_4/A_2 \leqq = 0.08, \text{ and}$$

$$0 \leqq = A_3/A_4 \leqq = 0.169.$$

5. Mass spectrometer having an overlaid, hexapole field according to claim 1, characterized in that the surface shapes of the end cap electrodes (1, 2) $r_k(z)$ and of the ring electrode (3) $r_r(z)$ are established according to the equations $$r_k = \sqrt{(2z^2 - 2z_0 2 * g(z))}$$

and $$r_r = \sqrt{(2z^2 + 2z_0 2 * g(z))}$$

with $g(z) = (A_2/A_3)/(A_2 + 3 * A_3 * z/z_0)$, and $0.001 >= A_3/A_2 >= 0.2$.

6. Mass spectrometer according to claim 1 with approximated hexapole and octopole fields, characterized in that the multipole fields are generated by surface shapes of the electrodes (1, 2, 3) according to the equations $$z_r(r) = (w_r + (p_1 * w_r) + (p_2 * w_{r2}) + (p_3 * w_r^3)),$$

$$z_k(r) = (w_k + (p_1 * w_k) + (p_2 * w_k^2) + (p_3 * w_k^3)),$$

with $$w_r = w_r(r) = ((r_2 - r_0^2)/2),$$

$$w_k = w_k(r) = ((r^2 + r_0^2)/2),$$

and $0 \leqq p_1 \leqq 0.2$ (approximated octopole part) or $0 \leqq p_2 \leqq 0.2$ (approximated hexapole part), and/or $0 \leqq p_3 \leqq 0.2$ (for a more closely-approximated octopole part), however not with $p_1$, $p_2$, $p_3$ disappearing simultaneously.

* * * * *